(12) United States Patent
Thakkar et al.

(10) Patent No.: US 9,883,044 B2
(45) Date of Patent: *Jan. 30, 2018

(54) TECHNIQUES FOR A MIXED AUDIO CONFERENCE

(71) Applicant: MICROSOFT TECHNOLOGY LICENSING, LLC, Redmond, WA (US)

(72) Inventors: Pulin Thakkar, Redmond, WA (US); Bimal Mehta, Redmond, WA (US); Dhigha Sekaran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/046,552

(22) Filed: Feb. 18, 2016

(65) Prior Publication Data

US 2016/0165064 A1 Jun. 9, 2016

Related U.S. Application Data

(63) Continuation of application No. 11/807,396, filed on May 29, 2007, now Pat. No. 9,294,721.

(51) Int. Cl.
*H04L 12/28* (2006.01)
*H04M 7/12* (2006.01)
(Continued)

(52) U.S. Cl.
CPC .......... *H04M 7/1205* (2013.01); *H04L 12/66* (2013.01); *H04M 3/567* (2013.01); *H04M 7/006* (2013.01); *H04N 7/15* (2013.01); *H04N 7/152* (2013.01); *H04M 7/123* (2013.01); *H04M 2207/20* (2013.01)

(58) Field of Classification Search
USPC .................. 370/261, 352–356, 401, 466
See application file for complete search history.

(56) References Cited

U.S. PATENT DOCUMENTS 5,341,374 A 8/1994 Lewen et al.
6,353,610 B1 3/2002 Bhattacharya et al.
(Continued)

OTHER PUBLICATIONS

Smith et al., "Tandem-free VoIP conferencing: a bridge to next-generation networks", Communications Magazine, IEEE, Date: May 2003, vol. 41, Issue: 5, Abstract.
(Continued)

*Primary Examiner* — John Pezzlo
(74) *Attorney, Agent, or Firm* — Schwegman Lundberg & Woessner, P.A.

(57) ABSTRACT

Techniques for a mixed audio conference are described. An apparatus may comprise an audio video multipoint control unit to mix call information from multiple call connections established over a packet-switched network for a conference call. The apparatus may comprise a telephony gateway communicatively coupled to the audio video multipoint control unit. The telephony gateway may establish a bridge connection with a conference bridge servicing a call connection over a circuit-switched network, the telephony gateway to translate call information from the call connection for use by the audio video multipoint control unit. Other embodiments are described and claimed.

20 Claims, 4 Drawing Sheets

(51) Int. Cl.
*H04M 3/56* (2006.01)
*H04M 7/00* (2006.01)
*H04N 7/15* (2006.01)
*H04L 12/66* (2006.01)
*H04J 1/16* (2006.01)

(56) References Cited

U.S. PATENT DOCUMENTS

| | | |
|---|---|---|
| 6,366,577 B1 | 4/2002 | Donovan |
| 6,501,740 B1 | 12/2002 | Sun et al. |
| 6,657,975 B1 | 12/2003 | Baxley et al. |
| 6,961,416 B1 | 11/2005 | Summers et al. |
| 6,981,022 B2 | 12/2005 | Boundy |
| 6,996,603 B1 | 2/2006 | Srinivasan |
| 7,016,343 B1 | 3/2006 | Mermel et al. |
| 7,145,898 B1 | 12/2006 | Elliott |
| 7,145,900 B2 | 12/2006 | Nix et al. |
| 2004/0086093 A1 | 5/2004 | Schranz |
| 2005/0058125 A1 | 3/2005 | Mutikainen et al. |
| 2005/0180342 A1 | 8/2005 | Summers et al. |
| 2005/0180406 A1 | 8/2005 | Sagiv |
| 2005/0265325 A1 | 12/2005 | Tsai |
| 2006/0079280 A1 | 4/2006 | LaPerch |
| 2006/0142010 A1* | 6/2006 | Tom .............. H04Q 3/0045 455/445 |
| 2007/0081647 A1 | 4/2007 | Baker |
| 2007/0162553 A1 | 7/2007 | Dewing et al. |
| 2008/0068446 A1 | 3/2008 | Barkley et al. |
| 2008/0086564 A1* | 4/2008 | Putman .............. H04L 29/06 709/227 |

OTHER PUBLICATIONS

Yankolovich et al., "Meeting Central: Making Distributed Meetings More Effective", Proceedings of the 2004 ACM conference on Computer supported cooperative work, (2004), 10 pages.

* cited by examiner

200

- ESTABLISH A CONFERENCE CALL OVER A PACKET-SWITCHED NETWORK
  202
- ESTABLISH A BRIDGE CONNECTION BETWEEN A TELEPHONY GATEWAY AND A CONFERENCE BRIDGE SERVICING A CALL CONNECTION OVER A CIRCUIT-SWITCHED NETWORK
  204
- CONVERT CALL INFORMATION FROM THE CALL CONNECTION FOR COMMUNICATION OVER THE PACKET-SWITCHED NETWORK
  206

FIG. 2

TECHNIQUES FOR A MIXED AUDIO CONFERENCE

CROSS-REFERENCE TO RELATED APPLICATION

This application is continuation of and claims priority to U.S. patent application Ser. No. 11/807,396 entitled "Techniques For a Mixed Audio Conference," filed on May 29, 2007, the subject matter of which is hereby incorporated by reference in its entirety.

BACKGROUND

Conventional conference calls are typically limited to managing call connections over homogeneous networks. For example, all participants to a conventional audio conference call typically establish call connections over a circuit-switched network, such as the Public Switched Telephone Network (PSTN). Similarly, with the recent adoption of Voice Over Packet (VOP) or Voice Over Internet Protocol (VoIP) services (collectively referred to herein as "VoIP"), all participants to a multimedia conference typically establish call connections over a packet-switched network, such as the Internet. For a conference call to establish and manage call connections over a circuit-switched network and a packet-switched network, however, a participant generally needs to manually establish a connection between two or more conference systems, assuming such capabilities even exist. This may entail locating and entering an additional set of dialing information, passcodes, and other connection information in a very limited amount of time. Such time-limited manual connection operations may be difficult, prone to error, and time consuming for a conference coordinator.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to communications systems. Some embodiments may be particularly directed to communications system capable of providing conference call services. More specifically, some embodiments may be arranged to manage a conference call having call connections established over mixed or heterogeneous networks, such as a packet-switched network and a circuit-switched network, for example. Typically such heterogeneous call connections need to be performed manually if at all.

In one embodiment, for example, an apparatus may include an audio video multipoint control unit to mix call information from multiple call connections for a conference call. The apparatus may comprise a telephony gateway communicatively coupled to the audio video multipoint control unit. The telephony gateway may establish a bridge connection with a conference bridge servicing a call connection over a circuit-switched network, the telephony gateway to translate call information from the call connection for use by the audio video multipoint control unit. In this manner, a conference chair or automated system may control a conference call utilizing call connections from different types of networks. Other embodiments are described and claimed.

BRIEF DESCRIPTION OF THE DRAWINGS

FIG. 2 illustrates one embodiment of a logic flow.

DETAILED DESCRIPTION

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" or similar language are not necessarily referring to the same embodiment.

Various embodiments may be directed to managing conference calls having call connections over mixed or heterogeneous networks. Various embodiments utilize a telephony gateway to automatically join call connections from different networks or conference systems, such as circuit-switched networks and packet-switched networks. In one embodiment, for example, an apparatus may include an audio video multipoint control unit (AVMCU) to mix call information from multiple VoIP call connections. A conference having one or more call connections established over a packet-switched network such as the Internet may be referred to herein as a "VoIP conference." The VoIP conference call may comprise either an audio conference call or a multimedia conference call (e.g., audio, video, text, and so forth), depending upon the type of equipment available to the participants. The apparatus may include a telephony gateway to establish a bridge connection with a conference bridge for a conference system managing a call connection over a circuit-switched network, such as the PSTN. A conference having one or more call connections over a circuit-switched network such as the PSTN may be referred to herein as a "PSTN conference." The telephony gateway and/or AVMCU may bridge, join, add or otherwise provide call information from the PSTN conference to the VoIP conference call using the bridge connection. For example, the telephony gateway may translate call information from the circuit-switched signals received over a circuit-switched call connection to packet-switched signals for use by the AVMCU. In this manner, a conference chair or automated system may control a conference call utilizing call connections from different types of networks, without having to manually join different conference systems, thereby providing relatively seamless integration between the disparate systems.

Figure 1:
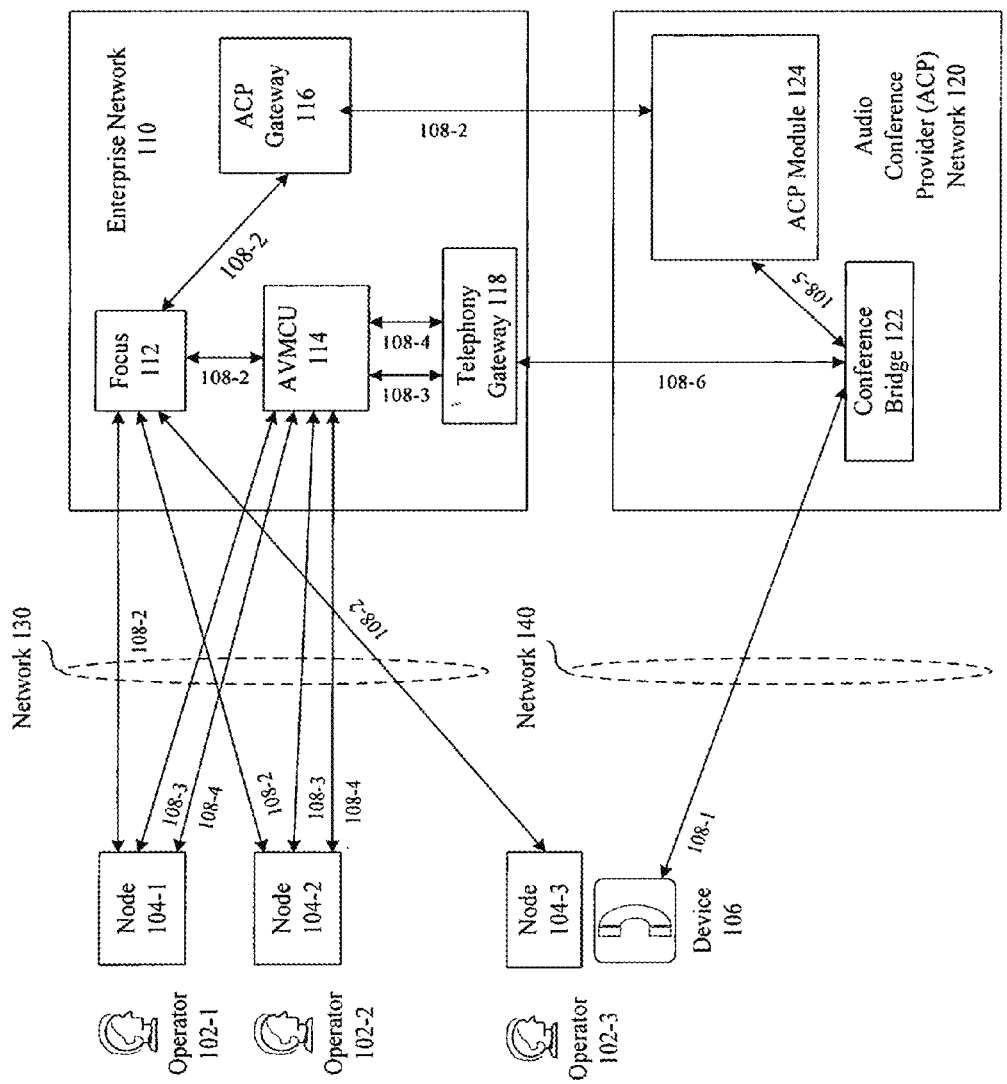
FIG. 1 illustrates one embodiment of an audio conference system.

FIG. 1 illustrates a block diagram of an audio conference system 100. The audio conference system 100 may represent any conference system arranged to establish, process, communicate, or otherwise manage a conference call over a communications network. As shown in FIG. 1, one embodiment of the audio conference system 100 may include multiple users or operators 102-1-m having access to multiple client terminals or nodes 104-1-n. The client nodes 104-1-n may communicate with an enterprise network 110 and/or an audio conference provider (ACP) network 120. The enterprise network 110 may comprise, for example, a VoIP conference system arranged to provide VoIP conference services to one or more of the client nodes 104-1-n. The ACP network 120 may comprise, for example, a PSTN conference system arranged to provide PSTN conference services to one or more of the client nodes 104-1-n.

As shown in the illustrated embodiment, the client nodes 104-1, 104-2, 104-3 may communicate with the enterprise network 110 via a packet-switched network 130. The operator 102-3 of the client node 104-3 may use a device 106 to communicate with the ACP network 120 via a circuit-switched network 140. Examples of the networks 130, 140 may include respectively the Internet and PSTN, although they are not necessarily limited to such examples. The enterprise network 110 may further comprise a conference focus 112, an AVMCU 114, an ACP gateway 116 and a telephony gateway 118. The ACP network 120 may further comprise a conference bridge 122 and an ACP module 124. The ACP module 124 may further comprise an ACP component 126. Although FIG. 1 illustrates a limited number of elements in a given topology, it may be appreciated that a given implementation may include more or less elements in a different topology as desired for a given set of performance or design constraints. The embodiments are not limited in this context.

In various embodiments, the audio conference system 100 may include one or more client nodes 104-1-n. The client nodes 104-1-n may comprise any physical or logical communication device capable of establishing a VoIP call connection with the enterprise network 110 via the packet-switched network 130. Examples of the client nodes 104-1-n may include without limitation a digital telephone, a packet telephone, a VoIP telephone, a cellular telephone with data communications capabilities, a computer, a personal computer, a laptop computer, a handheld computer, a mobile computer, a server, a workstation, an appliance, a network appliance, and so forth. In one embodiment, for example, the client nodes 104-1-n may comprise computers utilizing application software such as the MICROSOFT® OFFICE LIVE MEETING WINDOWS-BASED MEETING CONSOLE, made by Microsoft Corporation, Redmond, Wash. MICROSOFT OFFICE LIVE MEETING is a web conferencing service, and the client nodes 104-1-n having the installed client software are considered meeting consoles that can participate in a web conference or VoIP conference.

In various embodiments, the audio conference system 100 may include one or more call devices 106. The call device 106 may comprise any physical or logical device capable of establishing a PSTN call connection with the ACP network 120. Examples of the call device 106 may include without limitation a telephone, a call terminal, a plain old telephone service (POTS) telephone, a cordless telephone, an analog telephone, a cellular telephone with voice communication capabilities. In one embodiment, for example, the call device 106 may comprise a telephone capable of communicating voice or audio information.

In various embodiments, the client nodes 104-1-n may be capable of establishing a VoIP conference call with the enterprise network 110 using VoIP technologies. In one embodiment, for example, the nodes 104-1-n and the enterprise network 110 may establish a VoIP conference call using a VoIP signaling protocol as defined and promulgated by the Internet Engineering Task Force (IETF) standards organization, such as the Session Initiation Protocol (SIP) as defined by the IETF series RFC 3261, 3265, 3853, 4320 and progeny, revisions and variants. In general, the SIP signaling protocol is an application-layer control and/or signaling protocol for creating, modifying, and terminating sessions with one or more participants. These sessions include IP telephone calls, multimedia distribution, and multimedia conferences. In one embodiment, for example, the nodes 104-1-n and the enterprise network 110 may establish a VoIP conference call using a data or media format protocol, such as the Real-time Transport Protocol (RTP) and Real-time Transport Control Protocol (RTCP) as defined by the IETF RFC 3550 and progeny, revisions and variants. The RTP/RTCP standard defines a uniform or standardized packet format for delivering multimedia information (e.g., audio and video) over a packet-switched network, such as the packet-switched network 130. Although some embodiments may utilize the SIP and RTP/RTCP protocols by way of example and not limitation, it may be appreciated that other VoIP protocols may also be used as desired for a given implementation.

In various embodiments, the enterprise network 110 may include the conference focus 112. The conference focus 112 may comprise a conference server arranged to establish a SIP conference with two or more of the client nodes 104-1-n. In one embodiment, for example, the client nodes 104-1-n and the conference focus 112 may be implemented as SIP user agents. The SIP user agents of the client nodes 104-1-n may be associated with the SIP user agent of the conference focus 112 to form a SIP conference. The conference focus 112 has direct peer-wise relationships with each of the client nodes 104-1-n by maintaining a separate SIP dialog with each of the client nodes 104-1-n. In one embodiment, for example, the conference focus 112 may be implemented using a MICROSOFT OFFICE COMMUNICATIONS SERVER, and the client nodes 104-1-n may be implemented as a MICROSOFT OFFICE COMMUNICATOR CLIENT, both made by Microsoft Corporation, Redmond, Wash.

In addition to the normal capabilities of a SIP user agent, the SIP user agent of the conference focus 112 has abilities to host SIP conferences including their creation, maintenance, and manipulation using SIP call control technologies and potentially other non-SIP technologies. In this tightly coupled model, the SIP conference graph is typically a star topology. The conference focus 112 maintains the correlation among the SIP dialogs internally. The conference focus 112 can be implemented either by a participant or by a separate application server (as shown in FIG. 1). In the former case, a conference focus 112 is typically capable of hosting a simple ad hoc conference only using SIP call control primitives. In the latter case, a dedicated conference focus 112 as shown in FIG. 1, may offer richer functionality including simultaneous conferences, large scalable conferences, reserved conferences, and managed conferences. The media graph of a SIP conference can be centralized, decentralized, or any combination of both, and potentially differ per media type. In the centralized case, the media sessions are established between the conference focus 112 and each one of the participants. In the de-centralized (e.g., distributed) case, the media graph is a multicast or multi-unicast mesh among the participants. Consequently, the media processing (e.g., mixing) can be performed either by the conference server alone or by the participants. Conference participants and third parties can have different roles and privileges in a certain conference. For example, conference policy can state that the rights to disconnect from and to invite to a conference are limited to the conference chair only.

In one embodiment, for example, the enterprise network 110 may include the AVMCU 114. The AVMCU 114 may comprise a device to mix call information from multiple VoIP call connections for a VoIP conference call. The AVMCU 114 is typically an endpoint on the enterprise network 110 that provides the capability for two or more client nodes 104-1-$n$ and gateways to participate in a multipoint conference. In various implementations, the AVMCU 114 may include, among other components, a mandatory multipoint controller (MC) and optional multipoint processors (not shown).

In one embodiment, for example, the enterprise network 110 may include the ACP gateway 116. The ACP gateway 116 may provide gateway services for the ACP module 124 of the ACP network 120. For example, the ACP gateway 116 may communicate conference bridge connection information to automatically establish a bridge connection between the networks 110, 120 via the telephony gateway 118.

In one embodiment, for example, the enterprise network 110 may include the telephony gateway 118. The telephony gateway 118 may comprise any electronic device arranged to provide an interface between the networks 110, 120. In one embodiment, for example, the telephony gateway 118 may be arranged to establish a bridge connection between the networks 110, 120. For example, the telephony gateway 118 may have capabilities to dial into a conference call hosted by the AVMCU 114 over the network 130 and/or a conference call hosted by the conference bridge 122 over the network 140. In this manner, the telephony gateway 118 may provide a bridge between different conference systems, thereby providing both of the networks 110, 120 the capability of establishing and managing a conference call using mixed or heterogeneous call connections established over the different networks 130, 140, for example.

In various embodiments, the telephony gateway may be implemented in various parts of the audio conference system 100. When implemented as part of the enterprise network 110 as shown in FIG. 1, for example, the dial out operations may be initiated by the AVMCU 114 causing the telephony gateway 118 to dial into the conference bridge 122. This may be advantageous when attempting to provide a higher level of security for a given conference call. When implemented as part of the ACP network 120, however, the dial out operations may be initiated by the conference bridge 122 causing the telephony gateway 118 to dial into the AVMCU 114 of the enterprise network 110, or alternatively another telephony gateway hosted by the enterprise network 110. Although some embodiments describe bridging operations performed from the perspective of the enterprise network 110 by way of example and not limitation, it may be appreciated that similar bridging operations may be performed from the perspective of the ACP network 120. The embodiments are not limited in this context.

In one embodiment, for example, the ACP network 120 may include the conference bridge 122 and the ACP module 124. The conference bridge 122 may comprise an electronic device capable of establishing and managing a conference call over a circuit-switched network, such as the network 140. The ACP module 124 may comprise an ACP application program to control the conference call operations of the conference bridge 122.

In general operation, the audio conference system 100 may establish, facilitate, or otherwise manage conference calls having call connections over mixed or heterogeneous networks, such as networks 130, 140. For example, the operators 102-1, 102-2, 102-3 may use the respective client nodes 104-1, 104-2, 104-3 to establish multiple Centralized Conference Control Protocol (CCCP) connections 108-2 with the conference focus 112 to participate in or join a VoIP conference call. CCCP is a custom protocol in Microsoft Office Communications Server. CCCP is used for the exchange of the conference creation information and the control commands between Microsoft Office Communicator clients and Microsoft Office Communications Server. The client nodes 104-1, 104-2, 104-3 may also establish multiple SIP connections 108-3 with the AVMCU 114 to communicate SIP control information, and multiple RTP/RTCP connections 108-4 with the AVMCU 114 to communicate media information, including voice or audio information. At the same or later time, the operator 102-3 of client node 104-3 may use a call terminal such as the call device 106 to establish a circuit-switched call connection 108-1 with the conference bridge 122 over the circuit-switched network 140.

In various embodiments, the telephony gateway 118 may be used to join the call connections for the VoIP conference call managed by the enterprise network 110 and the call connections for the PSTN conference call managed by the ACP network 120. In one embodiment, the telephony gateway 118 may be used to establish a bridge connection between the conference bridge 122 of the ACP network 120 and the AVMCU 114 of the enterprise network 110. For example, the AVMCU 114 may establish a SIP connection 108-3 and a RTP/RTCP connection 108-4 with the telephony gateway 118. In this manner, the telephony gateway 118 is also a SIP user agent effectively treated as a participant in the SIP conference managed by the enterprise network 110. The telephony gateway 118 may also establish a circuit-switched bridge connection 108-6 with the conference bridge 122 to join the PSTN conference call managed by the ACP network 120. The operator 102-3 may communicate audio information from the call terminal 106 to the conference bridge 122 over the circuit switched call connection 108-1, and from the conference bridge 122 to the telephony gateway 118 over the circuit switched bridge connection 108-6. The telephony gateway 118 may receive the circuit-switched signals from the conference bridge 122, and convert, map or translate the call information from the circuit-switched signals to packet-switched signals. The telephony gateway 118 may then communicate the converted call information to the AVMCU 114 as packet-switched signals. For example, the telephony gateway 118 may communicate any converted call control signals via the SIP connection 108-3 (if needed) and any converted media information via the RTP/RTCP connection 108-4. The AVMCU 114 may then mix the converted call information from the telephony gateway 118 with the call information received from the client nodes 104-1, 104-2. In this manner, the operator 102-3 may join the audio portion of the VoIP conference call managed by the enterprise network 110 using the call device 106 even though it is incompatible with the VoIP technologies implemented by the enterprise network 110 and the other participants in the VoIP conference call. The operator 102-3 may participate in the other modalities of the VoIP conference call, such as video services and text services, using the client node 104-3. Accordingly, a conference chair or automated system may control or manage a conference call utilizing call connections from different types of networks 130, 140.

Operations for the audio conference system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the audio conference system 100 or alternative elements as desired for a given set of design and performance constraints.

FIG. 2 illustrates a logic flow 200. Logic flow 200 may be representative of the operations executed by one or more embodiments described herein. As shown in logic flow 200, the logic flow 200 may establish a conference call over a packet-switched network at block 202. The logic flow 200 may establish a bridge connection between a telephony gateway and a conference bridge servicing a call connection over a circuit-switched network at block 204. The logic flow 200 may convert call information from the call connection for communication over the packet-switched network at block 206. The embodiments are not limited in this context.

In one embodiment, the logic flow 200 may establish a conference call over a packet-switched network at block 202. For example, the conference focus 112 and the AVMCU 114 may establish a VoIP conference call between the client nodes 104-1, 104-2, 104-3. Assume the client node 104-3 provides various meeting tools, such as whiteboard tools and video tools, but is not equipped with audio equipment such as a microphone and speaker. Consequently, the operator 102-3 may be capable of participating in the VoIP conference call to access some of the VoIP conference services via the client node 104-3, but may not be capable of communicating audio information with the other participants (operators 102-1, 102-2) in the conference using the client nodes 104-1, 104-2. Accordingly, the operator may establish a call connection 108-1 between the call device 106 and the AVMCU 114 using the conference bridge 122 and the telephony gateway 118 as previously described.

In one embodiment, the logic flow 200 may establish a bridge connection between a telephony gateway and a conference bridge servicing a call connection over a circuit-switched network at block 204. For example, once the call connection 108-1 over the circuit-switched network 140 has been established between the call device 106 and the conference bridge 122, a bridge connection 108-6 may be established between the telephony gateway 118 and the conference bridge 122. In some cases, the bridge connection 108-6 may be initiated by the telephony gateway 118, and in other cases the bridge connection 108-6 may be initiated by an element of the ACP network 120, such as the ACP module 124, for example.

In one embodiment, the logic flow 200 may convert call information from the call connection for communication over the packet-switched network at block 206. For example, once the bridge connection 108-6 has been established between the telephony gateway 118 and the conference bridge 122, the telephony gateway 118 may begin converting or translating the call information communicated by the circuit-switched call connections 108-1, 108-6 from a circuit-switched format to the packet-switched format used by the AVMCU 114. The call information may comprise, for example, voice or audio information generated by the call device 106, which may be converted to media information for communication via the RTP/RTCP connection 108-4.

In various embodiments, the telephony gateway 118 may establish the bridge connection 108-6 with the conference bridge 122 using conference bridge connection information. The conference bridge connection information may comprise any information that enables the telephony gateway 118 to establish the bridge connection 108-6 with the conference bridge 122, such as a conference bridge number, a post-dial string, a unique identifier, a password, an address, an access number, an access code, and so forth. The embodiments are not limited with regard to the type of conference bridge connection information used for a given implementation, as long as it is commonly defined between devices.

In one embodiment, the conference bridge connection information may comprise a conference bridge number to directly establish the bridge connection 108-6 with the conference bridge 122. For example, the ACP module 124 may establish or set up a special conference bridge number or access number suitable for automated clients. The special conference bridge number may allow the telephony gateway 118 to enter the PSTN conference managed by the conference bridge 122 without having to navigate any voice prompts typically provided by an interactive voice response (IVR) system implemented for the ACP network 120. In this manner, the telephony gateway 118 may dial into the conference bridge 122 and automatically be allowed to join the PSTN conference managed by the ACP network 120. This embodiment may require the ACP module 124 to program the conference bridge 122 with a special conference bridge number or access number corresponding to each regular conference bridge number used by the PSTN clients, or at least for those regular conference bridge numbers that are known to be used for mixed PSTN and VoIP conferences. In this case, the special conference bridge number will typically comprise a conference bridge number that is different from the conference bridge number used by the client node 104-3 to join the conference call managed by the ACP network 120. In such cases, the ACP network 120 could program the code (outside of the ACP module 124) to provision this entry point. The ACP network 120 can publish this information to the rest of conferencing components via the ACP module 124. Furthermore, the entry point may include the special phone number and a post-dial DTMF sequence (post-dial string) in order to authenticate the automated client that is dialing into the conference bridge 122.

In one embodiment, for example, the conference bridge connection information may comprise a conference bridge number and a post-dial string to indirectly establish the bridge connection 108-6 with the conference bridge 122. In this case, the conference bridge number may be the same or different conference bridge number as used by the client node 104-3 to join the conference call managed by the ACP network 120. The post-dial string may provide dialing information that allows the telephony gateway 118 to navigate any voice prompts established by the IVR system. For example, the post-dial string may comprise a dual-tone multi-frequency (DTMF) sequence used for telephone signaling over the line in the voice-frequency band to the conference bridge 122. The post-dial string may also include control information, commands or conference access information, such as a meeting identification pass code, response characters such as the pound ("#") key or star ("*") key, delay codes such as a sequence of commas or letters ("p") to provide periodic delays (e.g., 1 second pauses), and so forth. The delay codes may be used, for example, to time responses to the IVR system prompts to coincide with the pause intervals provided after the IVR system prompts. One advantage of this embodiment is that it does not require any modifications to the ACP network 120.

A certain number of modifications may be made to the CCCP schema to support post-dial operations. For example, an existing endpoint schema (e.g., ms-ci.xsd) for CCCP may be modified to include a new element name as follows:
    <xs:element ref="msci:post-dial" minOccurs="0"/>
The new "mcsi:post-dial: schema (e.g., ms-ci-ext.xsd) may comprise the following:
    <xs:element name="post-dial" type="xs:string"/>
An example of usage for the post-dial feature is as follows:

```
<request ... >
    <addUser>
        <conferenceKeys ... />
        <user ... >
            <endpoint entity= "sip:+1-8005551212@csp.com">
                <joining-method>dialed-out</joining-method>
                <post-dial>pppppp123456#pppppp#</post-dial>
            </endpoint>
        </user>
    </addUser>
</request>
```

In one embodiment, the type of the "post-dial" element may be a string. In one embodiment, for example, the format and structure of the post-dial string may conform to the IEEE RFC 3601. For PSTN integration, some embodiments will typically use a subset of allowed characters, including the numeric digits 0 through 9, the pound (#) sign, the star (*) symbol, and a "p" for a one second pause. In some cases, the "post-dial" string may also include any separator characters (e.g., "-" or "."), a "w" for a "wait until tone," or special DTMF tones "A" through "D."

For each DTMF element that produces a tone (e.g., the digits, #, and *, but not "p"), the tone should be produced for an amount of time that enables the receiving end to recognize the tone, and tones should be separated by enough silence time to enable the receiving end to distinguish them. For example, the IEEE RFC 2833 indicates that DTMF digit recognition may take several tens of milliseconds (ms). Tone lengths may vary from 50 ms to 250 ms, and the separation silence varies from 350 ms to 600 ms. The exact tone and pause lengths may be determined for a given implementation of the ACP network 120.

Figure 3:
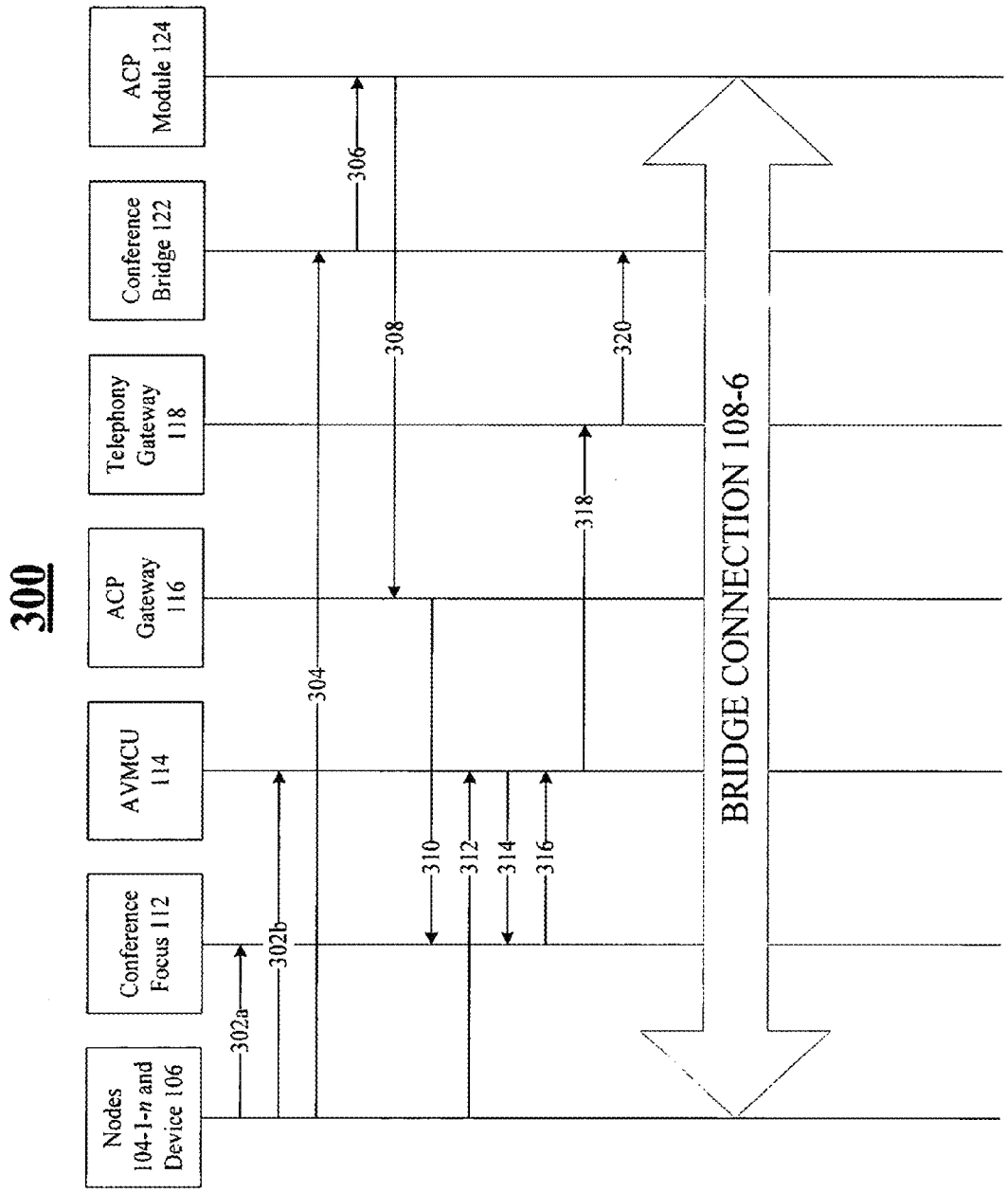
FIG. 3 illustrates one embodiment of a message flow.

FIG. 3 illustrates one embodiment of a message flow 300. The message flow 300 may be representative of a message flow between various elements of the audio conference system 100. As shown in FIG. 3, the message flow 300 illustrates the client nodes 104-1, 104-2, 104-3 establishing call connections 108-2 with the conference focus 112, and call connections 108-3, 108-4 with the AVMCU 114, via the packet-switched network 130 as represented by messages 302a, 302b. The call device 106 establishes a call connection 108-1 with the conference bridge 122 via the circuit-switched network 140 as represented by a message 304. The conference bridge 122 informs the ACP module 124 of the call connection 108-1 as represented by a message 306.

The ACP module 124 may publish the conference bridge connection information for the telephony gateway 118 via the ACP gateway 116 as represented by a message 308. The ACP gateway 116 may send the published conference bridge connection information to the conference focus 112 as represented by a message 310. For example, the ACP module 124 may publish a conference bridge number and/or a post-dial string in the shared_data section of a conference document. The shared_data section of the conference document may be filtered out by the conference focus 112 before propagating it to the clients. The ACP module 124 will publish to the client whether it has posted conference bridge connection information in the shared_data section. In one embodiment, for example, the conference bridge number may comprise a telephone number in the E.164 format that the telephony gateway 118 needs to dial to get into the ACP phone conference. In one embodiment, for example, the post-dial string may include the DTMF sequence to dial once the phone call is connected to the conference bridge number.

When the conference bridge connection information for the ACP network 120 is available to the enterprise network 110, the bridging operations can be initiated at the appropriate time. For example, the bridging operations can be initiated when both the VoIP conference and the PSTN conference are activated and are mixing voice. The timing of the bridging can also be controlled explicitly by a conference chair (e.g., the operator 102-1) using the client node 104-1-n (e.g., the client node 104-1). For example, assume the operator 102-1 comprises a conference chair for the VoIP conference, and the operator 102-1 uses the client node 104-1 to initiate bridging operations for the VoIP conference and the ACP conference at the designated time by issuing a new link-pstn request to the AVMCU 114 as represented by a message 312. In some embodiments, the link-pstn request may optionally include the conference bridge connection information. To reset the VoIP/ACP bridging (the bridge connection 108-6), the client node 104-1 may issue an unlink-pstn request. The appropriate time will be determined by the conference chair based on other conference state information, such as when the following conditions become true: (1) an ACP conference is active (e.g., it is mixing audio); and (2) an AVMCU conference is active and has at least one participant.

On receiving the link-pstn request, and when the conference bridge connection information is not included in the link-pstn request, the AVMCU 114 will query the conference shared_state for the conference bridge connection information. The AVMCU 114 can get access to the conference state in several ways, as represented by messages 314, 316. For example, the AVMCU 114 may send a getConference request to the conference focus 112 on receiving the link-pstn request. In another example, the AVMCU 114 may subscribe for conference notifications on a conference bootstrap. In yet another example, the AVMCU 114 may send a getSharedData request to the conference focus 112 on receiving the link-pstn request. The AVMCU 114 will signal with the telephony gateway 118 to cause the telephony gateway 118 to dial into the ACP conference based on the conference bridge connection information provided in a request or by the ACP module 124 as represented by a message 318. The telephony gateway 118 will dial into the conference bridge 122 using the conference bridge connection information as represented by a message 320, thereby creating the bridge connection 108-6 directly between the networks 110, 120 and indirectly between the networks 130, 140. The link-pstn state (e.g., active or inactive) will be reflected in the entity-state for the AVMCU 114. It is worthy to note that this should not cause any updates to the roster. In this case, the SIP session with the telephony gateway 118 should not be treated as a user. If the ACP network 120 can identify the telephony gateway 118 based on the provided conference bridge connection information, then it will mark the user with the pstn_gw element.

Figure 4:
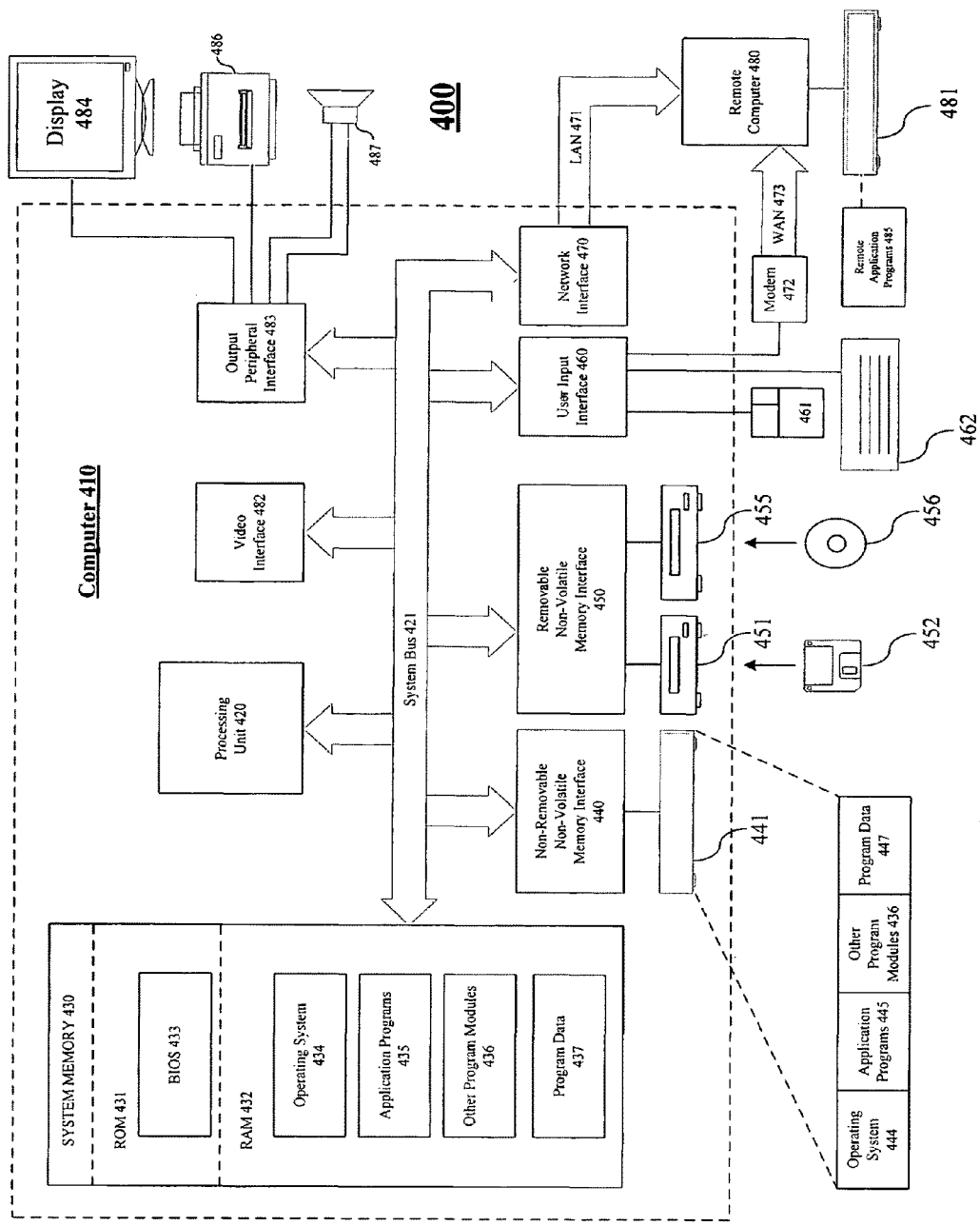
FIG. 4 illustrates one embodiment of a computing system architecture.

FIG. 4 illustrates a block diagram of a computing system architecture 400 suitable for implementing various embodiments, including the audio conference system 100. It may be appreciated that the computing system architecture 400 is only one example of a suitable computing environment and is not intended to suggest any limitation as to the scope of use or functionality of the embodiments. Neither should the computing system architecture 400 be interpreted as having any dependency or requirement relating to any one or combination of components illustrated in the exemplary computing system architecture 400.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 4, the computing system architecture 400 includes a general purpose computing device such as a computer 410. The computer 410 may include various components typically found in a computer or processing system. Some illustrative components of computer 410 may include, but are not limited to, a processing unit 420 and a memory unit 430.

In one embodiment, for example, the computer 410 may include one or more processing units 420. A processing unit 420 may comprise any hardware element or software element arranged to process information or data. Some examples of the processing unit 420 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 420 may be implemented as a general purpose processor. Alternatively, the processing unit 420 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 410 may include one or more memory units 430 coupled to the processing unit 420. A memory unit 430 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 410. The embodiments are not limited in this context.

In one embodiment, for example, the computer 410 may include a system bus 421 that couples various system components including the memory unit 430 to the processing unit 420. A system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 410 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 400. Examples of computer readable media for computing system architecture 400 may include, but are not limited to, volatile and/or nonvolatile memory such as ROM 431 and RAM 432. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 430 includes computer storage media in the form of volatile and/or nonvolatile memory such as ROM 431 and RAM 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 440 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 484 or other type of display device is also connected to the system bus 421 via an interface, such as a video interface 482. In addition to the monitor 484, computers may also include other peripheral output devices such as speakers 487 and printer 486, which may be connected through an output peripheral interface 483.

The computer 410 may operate in a networked environment using logical connections to one or more remote computers, such as a remote computer 480. The remote computer 480 may be a personal computer (PC), a server, a router, a network PC, a peer device or other common network node, and typically includes many or all of the elements described above relative to the computer 410, although only a memory storage device 481 has been illustrated in FIG. 4 for clarity. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other technique suitable for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other techniques for establishing a communications link between the computers may be used. Further, the network connections may be implemented as wired or wireless connections. In the latter case, the computing system architecture 400 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the audio conference system 100 and/or computing system architecture 400 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

As used herein the term "module" may include any structure implemented using hardware elements, software elements, or a combination of hardware and software elements. In one embodiment, for example, the modules described herein are typically implemented as software elements stored in memory and executed by a processor to perform certain defined operations. Although some embodiments show a limited number of modules, it may be appreciated that some or all of the defined operations may be implemented using more or less modules as desired for a given implementation. Furthermore, although some embodiments are described using software elements stored by memory for execution by a processor, it may be appreciated that some or all of the defined operations may be implemented using hardware elements based on various design and performance constraints. The embodiments are not limited in this context.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a logic circuit; and
an audio video multipoint control unit (AVMCU) executed on the logic circuit, the audio video multipoint control unit operative to process a new link-Public Switched Telephone Network (PSTN) request message corresponding to bridging operations for a Voice over Internet Protocol (VoIP) conference and an Audio Conference Provider (ACP) conference, designate a time to initiate the bridging operations based upon conference state data, and create a bridge connection between a network for the VoIP conference and a network for the ACP conference.

2. The apparatus of claim 1, the audio video multipoint control unit operative to mix converted call information from a telephony gateway with call information received from client nodes.

3. The apparatus of claim 1, the audio video multipoint control unit operative to initiate the bridging operations when both the VoIP conference and the ACP conference are activated and are mixing voice.

4. The apparatus of claim 1, the audio video multipoint control unit operative to extract conference bridge connection information included in the link-PSTN request.

5. The apparatus of claim 1, the audio video multipoint control unit operative to reset the VoIP/ACP bridge connection.

6. The apparatus of claim 1, the audio video multipoint control unit operative to receive an unlink-PSTN request.

7. The apparatus of claim 1, the audio video multipoint control unit operative to determine the time to create the bridge connection based upon other conference state data.

8. The apparatus of claim 1, the audio video multipoint control unit operative to determine the time to create the bridge connection based upon whether an ACP conference is active.

9. The apparatus of claim 1, the audio video multipoint control unit operative to determine the time to create the bridge connection based upon whether the audio video multipoint control unit is mixing audio, and an AVMCU conference is active and has at least one participant.

10. The apparatus of claim 1, the audio video multipoint control unit operative to query a conference shared state for conference bridge connection information.

11. The apparatus of claim 1, the audio video multipoint control unit operative to send a request to a conference focus on receiving the link-PSTN request.

12. The apparatus of claim 1, the audio video multipoint control unit operative to subscribe for conference notifications on a conference bootstrap.

13. The apparatus of claim 1, the audio video multipoint control unit operative to send a request to a conference focus on receiving the link-PSTN request.

14. The apparatus of claim 1, the audio video multipoint control unit operative to signal with the telephony gateway to cause a telephony gateway to dial into the ACP conference based on conference bridge connection information.

15. A computer-implemented method, comprising
processing, via processor hardware, a new link-Public Switched Telephone Network (PSTN) request message corresponding to bridging operations for a Voice Over Internet Protocol (VoIP) conference and an Audio Conference Provider (ACP) conference;
designating, via the processor hardware, a time to initiate the bridging operations based upon conference state data; and
creating, via the processor hardware, a bridge connection between a network for the VoIP conference and a network for the ACP conference.

16. The method of claim 15, further comprising mixing via the processor hardware, translated call information from a telephony gateway with call information received from client nodes.

17. The method of claim 15, further comprising bridging, via the processor hardware, a call connection from a circuit-switched network for the ACP conference to a conference call over a packet-switched network using the bridge connection.

18. An article of manufacture comprising a computer hardware storage medium containing instructions that if executed by processor hardware enable a system to:
process a new link-Public Switched Telephone Network (PSTN) request message corresponding to bridging operations for a Voice Over Internet Protocol (VoIP) conference and an Audio Conference Provider (ACP) conference;

designate a time to initiate the bridging operations based upon conference state data; and create a bridge connection between a network for the VoIP conference and a network for the ACP conference.

19. The article of claim 18, further comprising instructions that if executed by the processor hardware enable the system to receive conference bridge connection information comprising a conference bridge number to directly establish the bridge connection.

20. The article of claim 18, further comprising instructions that if executed by the processor hardware enable the system to initiate the bridging operations when both the VoIP conference and the ACP conference are activated and are mixing voice.

* * * * *